April 24, 1956  P. A. BOYD  2,742,728
TELESCOPING FISHING POLE
Filed July 12, 1954
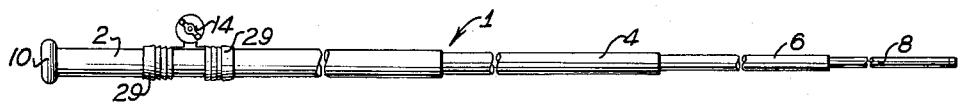
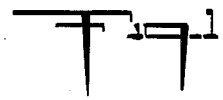
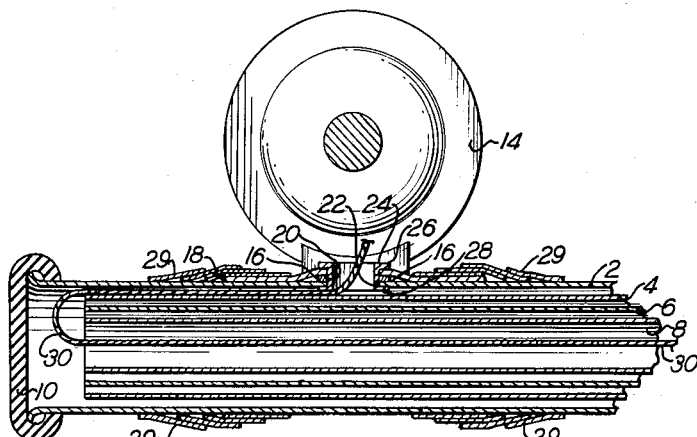
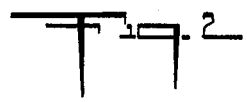
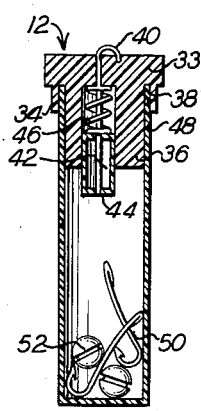
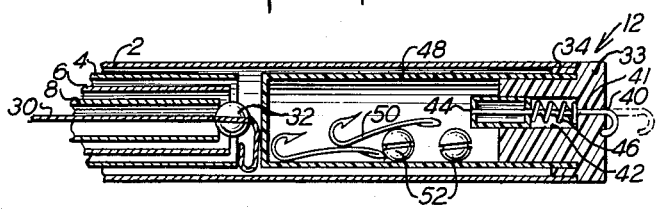
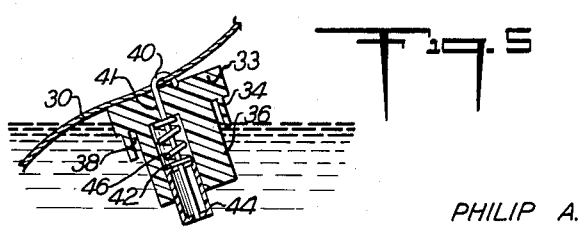
INVENTOR
PHILIP A. BOYD
BY  *James H. Littlepage*
ATTORNEY United States Patent Office 2,742,728
Patented Apr. 24, 1956

2,742,728

TELESCOPING FISHING POLE

Philip A. Boyd, Marion, Ind., assignor of fifty per cent to Claude Meyer, Fairmont, Ind.

Application July 12, 1954, Serial No. 442,751

2 Claims. (Cl. 43—18)

This invention relates to fishing kits and, more particularly, to a telescoping fishing pole having a reel, and a supply-containing float which forms a plug for the pole tip.

The object of this invention is to provide a completely self-contained fishing pole but which can be purchased as a unit and use, with no other encumbrance except bait. Heretofore, the typical fisherman, upon arrival at a cool and shady, but remote river bank, sometimes found that in his escape from civilization, he had neglected to include his reel, with line thereon, or that the hooks were missing. The object now is to provide a telescoping pole of the internally running line variety having, as a permanent part, a reel located on the pole handle by a grommet which forms a line guide from the reel to the pole interior.

Another object of the invention is to provide a combination pole-end plug and float, it being also intended that the pole-end plug be formed of two separable parts so that its size and buoyancy may be varied by using only one of the parts, or by using both parts together. A further object is that one of the separable plug parts be formed as a container for hooks and sinkers. By utilizing the float as a plug which keeps the tip end of the telescoping collapsed pole from extending, by action of gravity, it is virtually assured that the essential gear for catching fish accompanies the pole, and that the essentials cooperate to form an extremely compact unit.

These and other objects will be apparent in the following specification and accompanying drawings, in which;

Fig. 1 is a side elevation view showing the pole extended with reel mounted;

Fig. 2 is an enlarged fragmentary sectional view of the butt end of the collapsed pole, and showing the combination reel mount and line guide;

Fig. 3 is an enlarged fragmentary sectional view of the tip end of the collapsed pole, and showing the combination plug and double float used as a plug;

Fig. 4 shows the combination plug and float ready for use as a double float; and Fig. 5 shows the combination plug and float used as a single float.

Referring now to the drawing, in which like reference numerals denote similar elements, rod 1 is composed of a series of telescoping tubular sections starting with a butt end piece 2 of largest diameter, the succeeding sections 4 and 6 being of successively reduced diameter with tip section 8 being the smallest, each being formed of resin reinforced with glass fibres and characterized by extreme lightness, strength, and flexibility. Sections 2, 4, 6 and 8 are slightly conical and enlarged towards their rear ends so that they may be extended by pulling out the tip section 8 to the position shown in Fig. 1, but their conical configurations prevent separation beyond a normal extended condition. By forcing tip section 8 and the preceding sections 6 and 4 rearwardly, rod 1 is telescopically shortened so that all the smaller sections fit within butt end section 2, as shown in Figs. 2 and 3. A rubber butt cap 10 is removably engaged over the rear end of butt section 1. The rod section and butt cap described above are well known to those skilled in the art. In accordance with this invention, rod 1 is converted to a complete fishing kit by the addition of a combined plug, float and container 12 and a permanently mounted reel 14, both detailed hereinafter.

Reel 14 is generally of conventional form, and includes a metal base 16 extending transversely across the reel bottom, and an integral downwardly concave saddle strip 18 which extends lengthwise of the rod and fits closely over the top surface of butt end piece 2. However, a hole 20 is drilled through base 16 of reel 14, a similar hole 20 is drilled through butt end piece 2 of rod 1, and a grommet 24 is engaged in the holes 20 and 22. The upper and lower ends of grommet 24 are flanged over the saddle strip and under the inner wall of butt section 2 as indicated at 26 and 28 respectively, and the firm mounting of the reel on the rod is preferably completed by lengths of tape 29 which are wrapped around butt section 2 and over the ends of saddle strip 18. It will be apparent in Fig. 2 that grommet 24 not only constitutes a mounting for reel 14 on butt section 2, but also forms a guide through which a fishing line 30 is led from reel 14 to the interior of all sections 2, 4, 6 and 8. A split shot sinker 32 near the end of line 30 prevents loss of the bitter end when the line is reeled in.

Referring particularly to Figs. 3, 4 and 5, the combined plug, float and container 12 include a stopper head 33 with a depending cylindrical flange 34 having, between it and the stopper body 36, an annular slot 38. Stopper head 33, flange 34, and body 36 are formed of light flotation material, preferably one of the moldable plastics or it may, if desired, be formed as a hollow body. A short length of stiff wire is bent over at its end to form a line finger 40 whose shank slidably engages in a passage formed through stopper head 33 and body 36, as denoted at 41, while an enlarged recess 42 slidingly accommodates a plunger 44 affixed on the shank end of line finger 40. A compression spring 46 engaged between plunger 44 and the inner end of recess 42 normally retains line finger 40 in its full line position but, by depressing plunger 44, line finger 40 may be lifted off of stopper head 53 to its dotted line position so that line 30 may be engaged therebeneath. The operation of this type of line finger for floats is well known to fishermen.

Removably engaging around stopper body 36 and fitting within annular slot 38 is the end of a cylindrical transparent plastic cup 48. The interior of cup 48 is sufficiently large to hold a supply of hooks 50, sinkers 52 and other paraphernalia. As will be seen in Fig. 3, stopper flange 34 removably fits within the forward end of butt section 2 and when the pole sections 4, 6, and 8 are telescopically retracted there is sufficient room in the forward end of butt section 2 to accommodate cup 48.

In operation, the assembly is normally transported in its retracted position as shown in Figs. 2 and 3. The combined plug, float and container 12 then prevent accidental extension of sections 4, 6 and 8. When a promising fishing spot is found, the combined plug, float and container 12 is removed from the forward end of butt section 2. Then, by winding a turn of line 30 on reel 14, the forward ends of rod sections 4, 6 and 8 are driven forwardly sufficiently so that they may be manually grasped and extended to the Fig. 1 position. If a large and lively float is desired, cup 48 may be emptied and, after finger 40 has been engaged over line 30, cup 48 may be re-fitted over plug body 36; or, if a large but less lively float is desired, cup 48 may be suitably ballasted. If a minimum float is needed, the cup may be left off so that only stopper 33 is used, as indicated in Fig. 5.

The invention described hereinbefore is not limited to the illustrated details, but is intended to cover all substitutions, modifications and equivalents within the scope of the following claims.

I claim:

1. In combination, a hollow fishing rod through which a line passes from a butt end to a tip end, said rod having a cylindrical side wall adjacent the butt end, a reel having a base seating against the exterior of said side wall, said side wall and base having registering apertures therethrough whereby a line may pass from said reel to the interior of said rod, and means for holding said reel base against said side wall.

2. The combination claimed in claim 1, said means comprising a grommet fitting through said apertures and having end portions respectively flanged over the adjacent portion of said reel base and under the adjacent portion of the inner side of said side wall.

References Cited in the file of this patent

UNITED STATES PATENTS

| | | |
|---|---|---|
| 83,740 | Stetson | Nov. 3, 1868 |
| 1,001,195 | Gillette | Aug. 22, 1911 |
| 1,310,452 | Sliwinski | July 22, 1919 |
| 2,370,013 | Growell | Feb. 20, 1945 |
| 2,502,845 | Hoffman | Apr. 14, 1950 |
| 2,541,609 | Pullan | Feb. 13, 1951 |